(12) United States Patent
Byard et al.

(10) Patent No.: US 10,257,041 B2
(45) Date of Patent: Apr. 9, 2019

(54) DEEP NETWORK VALIDATION OF CONFIGURATION INPUTS FOR A NETWORK-DEPENDENT SYSTEM

(71) Applicant: VMware, Inc., Palo Alto, CA (US)

(72) Inventors: David Byard, Sunnyvale, CA (US); Jehad Affoneh, Kirkland, WA (US); Wit Riewrangboonya, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 291 days.

(21) Appl. No.: 15/181,109

(22) Filed: Jun. 13, 2016

(65) Prior Publication Data

US 2017/0054602 A1 Feb. 23, 2017

Related U.S. Application Data

(60) Provisional application No. 62/208,509, filed on Aug. 21, 2015, provisional application No. 62/208,456, filed on Aug. 21, 2015.

(51) Int. Cl.
*H04L 12/24* (2006.01)
*G06F 17/30* (2006.01)
*H04L 12/26* (2006.01)

(52) U.S. Cl.
CPC .... *H04L 41/0869* (2013.01); *G06F 17/30371* (2013.01); *G06F 17/30522* (2013.01); *H04L 41/0883* (2013.01); *H04L 43/06* (2013.01); *H04L 43/0823* (2013.01); *H04L 43/10* (2013.01)

(58) Field of Classification Search
CPC . H04L 41/0869; H04L 41/0883; H04L 43/06; H04L 43/0823; H04L 43/10; G06F 17/30371; G06F 17/30522
USPC ........................................................ 709/220
See application file for complete search history.

(56) References Cited

U.S. PATENT DOCUMENTS

| 6,381,250 B1 | 4/2002 | Jacobson et al. |
| 7,231,660 B1 * | 6/2007 | Daude ................. H04L 61/2015 709/220 |
| 8,953,539 B2 | 2/2015 | Jung et al. |
| 2005/0027858 A1 | 2/2005 | Sloth et al. |

(Continued)

*Primary Examiner* — Michael C Lai (57) ABSTRACT

A method for validating configuration inputs for a computing device dependent on a network, including: accessing a validated portion of input, wherein the validated portion of input is consistent with information internal to the computing device; determining if a content of the validated portion of input is sufficient to enable a network validation determination to be performed, thereby achieving a positive network probe determination or a negative network probe determination; based on the positive network probe determination, querying an external network to determine if the external network includes a configuration enabling a functioning of the computing device therein, wherein the external network is external to the computing device; and based on the querying, generating a network validation determination, wherein the network validation determination includes a determination as to whether or not the external network includes a configuration enabling a functioning of the computing device therein.

17 Claims, 6 Drawing Sheets

(56) References Cited

U.S. PATENT DOCUMENTS

| | | | |
|---|---|---|---|
| 2005/0125516 A1* | 6/2005 | Molnar | H04L 41/082 709/223 |
| 2008/0125043 A1 | 5/2008 | Karmanenko et al. | |
| 2010/0191965 A1 | 7/2010 | Fischer et al. | |
| 2011/0040860 A1* | 2/2011 | DeCusatis | H04L 41/0869 709/223 |
| 2013/0031037 A1* | 1/2013 | Brandt | H04L 63/1408 706/12 |
| 2014/0040443 A1 | 2/2014 | Syu et al. | |

* cited by examiner

DEEP NETWORK VALIDATION OF CONFIGURATION INPUTS FOR A NETWORK-DEPENDENT SYSTEM

CROSS-REFERENCE TO RELATED APPLICATIONS

This application claims priority to and benefit of U.S. Provisional Patent Application No. 62/208,509 filed Aug. 21, 2015 entitled "RESOLVING CONFIGURATION ERRORS THROUGH RECOMMENDATIONS" by Jehad Affoneh et al., which is herein incorporated by reference in its entirety.

This application claims priority to and benefit of U.S. Provisional Patent Application No. 62/208,456 filed Aug. 21, 2015 entitled "DEEP NETWORK VALIDATION OF CONFIGURATION INPUTS FOR A NETWORK DEPENDENT SYSTEM" by David Byard et al., which is herein incorporated by reference in its entirety.

This application is related to co-pending U.S. patent application Ser. No. 15/181,026, filed on Jun. 13, 2016, entitled "RESOLVING CONFIGURATION ERRORS THROUGH RECOMMENDATIONS," by Jehad Affoneh et al., and assigned to the assignee of the present application.

BACKGROUND

Typically, when a consumer product is added to a system and the consumer product is functionally dependent on configuration parameters that are associated with a network, an automatic setup is performed with some type (network setting or product setting information) of input being provided by the consumer. The user either determines that his/her user input is correct and then attempts to complete the setup process, or alternatively, attempts to complete the setup process while hoping that his/her user input is correct, with the intention of later troubleshooting any setup issues.

For example, if a system is dependent on a value for a DNS server, a user will typically either write a tool to verify that the DNS server is set up properly or, alternatively, enter a value to see if the system eventually reacts properly. Thus, in an effort to complete the setup of the DNS server within the system (or any other consumer product), the user either spends time and resources on determining that the input is correct, or, alternatively, assumes that the input is correct, forges ahead with the setup, and possibly creates an issue later on that requires troubleshooting.

In another example, a user may take the time to verify that a specific IP address is correctly associated with a node or a service. In yet another example, a user spends the time verifying that a range of IP addresses is available for use or that one or more nodes are configured to use ports in a specific manner. As noted, such validation takes time and resources, and therefore such options make user validation of configuration inputs more difficult and expensive.

Thus, limitations exist with current methods and systems for validating configuration inputs for a network-dependent system.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description of the drawings should not be understood as being drawn to scale unless specifically notes.

DESCRIPTION OF EMBODIMENTS

Reference will now be made in detail to various embodiments, examples of which are illustrated in the accompanying drawings. While various embodiments are discussed herein, it will be understood that they are not intended to be limiting. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding. However, embodiments may be practiced without one or more of these specific details. In other instances, well known methods, procedures, components, and circuits have not been described in detail as not to unnecessarily obscure aspects of the described embodiments.

Validating Network Parameters Used as Configuration Values for an Appliance

The discussion below begins with a brief overview of embodiments for validating network parameters used as configuration values for a computing device. A detailed discussion follows that describes a system (See FIGS. 1 and 2) and method of operation (See FIG. 3) regarding the validation of network parameters used as configuration values for a computing device. An example computer system, upon which the system operates and the methods of operation utilize is described (See FIG. 4). Next, a description of an "Appliance" (See FIG. 5) and a "Host Computing System" (See FIG. 6) is presented.

1. Brief Overview

Embodiments provide a method and system for validating that user input, such as network configuration information (e.g., network parameters, etc.) associated with a network-dependent computing device (e.g., system), is correct, based on known and/or discovered network configuration information. In other words, an embodiment determines if a computing device, that is desired to be setup within a network, can function as intended in that network. Embodiments perform this validation by comparing the network configuration information that is associated with the computing device and that is provided by the user or third party application with known and/or discovered information.

An embodiment sequentially engages in and analyzes the following three validation levels in making a determination that user input is in fact valid and thus effectively usable: 1)

syntactical level: an analysis of the format of the user input as compared to a format expected to be used by the computing device; 2) configuration model level: an analysis of the part of the configuration model that happens to be validated at the syntactical level and this validated portion's consistency with other portions of the configuration model; and 3) environmental level: a comparison of the validated consistent portions from the configuration model level with discovered (via network probing) network configuration information. In other words, the first layer, the syntactical level, examines if the user input is correct compared to what is expected. The second layer, the model configuration level, examines if the user input makes sense in the context of other configuration information associated with the computing device. The third layer, the environmental level, probes the network and examines whether the user input conflicts with configuration information discovered external to the computing device.

Of note, the analysis of the second and third level of validation will not proceed until the prior level of validation has been determined to be valid.

One use case scenario of an embodiment is described as follows. A user wishes to integrate a computing device within an existing network environment. The user provides network configuration information as input during setup of the computing device. An embodiment provides a system and method for determining if the computing device's network parameters correspond to (are able to operate in conjunction with) the network's parameters into which the computing device is being setup, and can thereby function as intended. Such a system and method avoids the trial and error method of attempting an installation of a computing device and then troubleshooting issues post-installation attempt.

For instance, during the syntactical level analysis, a user inputs (enters) an IP address as part of the network configuration information. In one embodiment, it is expected that the format of the IP address is to consist of four groups of integers, each separated from each other by a dot. The embodiment determines whether or not the IP address that the user input actually consists of four groups of integers, each separated by a dot. If a determination is made that the IP address that is input is the same (i.e., matches) as the expected format of the IP address, a "validation" at the syntactical level occurs, such that a determination is made as to whether or not the entered IP address matches the expected format of the IP address. In this instance, it is determined that such a match exists.

Subsequent to determining that the "match" exists, an embodiment proceeds to the configuration model level analysis, in which the syntactically validated portions of the configuration model are evaluated to determine if the configuration model is consistent with the other configuration model information stored at the computing device. For example, even though the IP address is validated because it consists of four groups of integers, each group separated from each other by a dot, the IP address is also analyzed to determine if the IP address is part of the local area network (LAN) to which it is intended to be connected. If it is determined that the IP address is in fact part of the LAN, and such a positive validation at the configuration model level occurs, then embodiments proceed to the environmental level analysis. At the environmental level analysis, the validated portions (i.e., the portions of the IP address that are found to be consistent with the other configuration information associated with computing device) of the configuration model are submitted to a network probe for determining if the IP address conflicts with configuration information discovered external to the computing device. For instance, the IP range that is for use internal to the computing device can be checked by the network probe to make sure that no one is using this IP range. The network probe, for instance, will check this IP range by attempting to ping an IP address within the IP range. If the network probe receives a response, then this indicates that the IP range is being used by another/other(s) and is considered to be "invalid" as part of the validation process. However, if the network probe does not receive a response from the IP address that was probed, then the IP range is considered to be "valid" as part of the validation process.

Thus, as will be explained in detail below, during the setup phase of a computing device within a network environment, embodiments provide a system and method to determine if input submitted by a user or a third party application is "valid" and that therefore, the computing device will be able to function as intended within the network environment. Embodiments reduce and/or eliminate the conventional trial and error setup methodology currently used to setup network-dependent computing devices within a system.

2. System: Deep Network Validator

Figure 1:
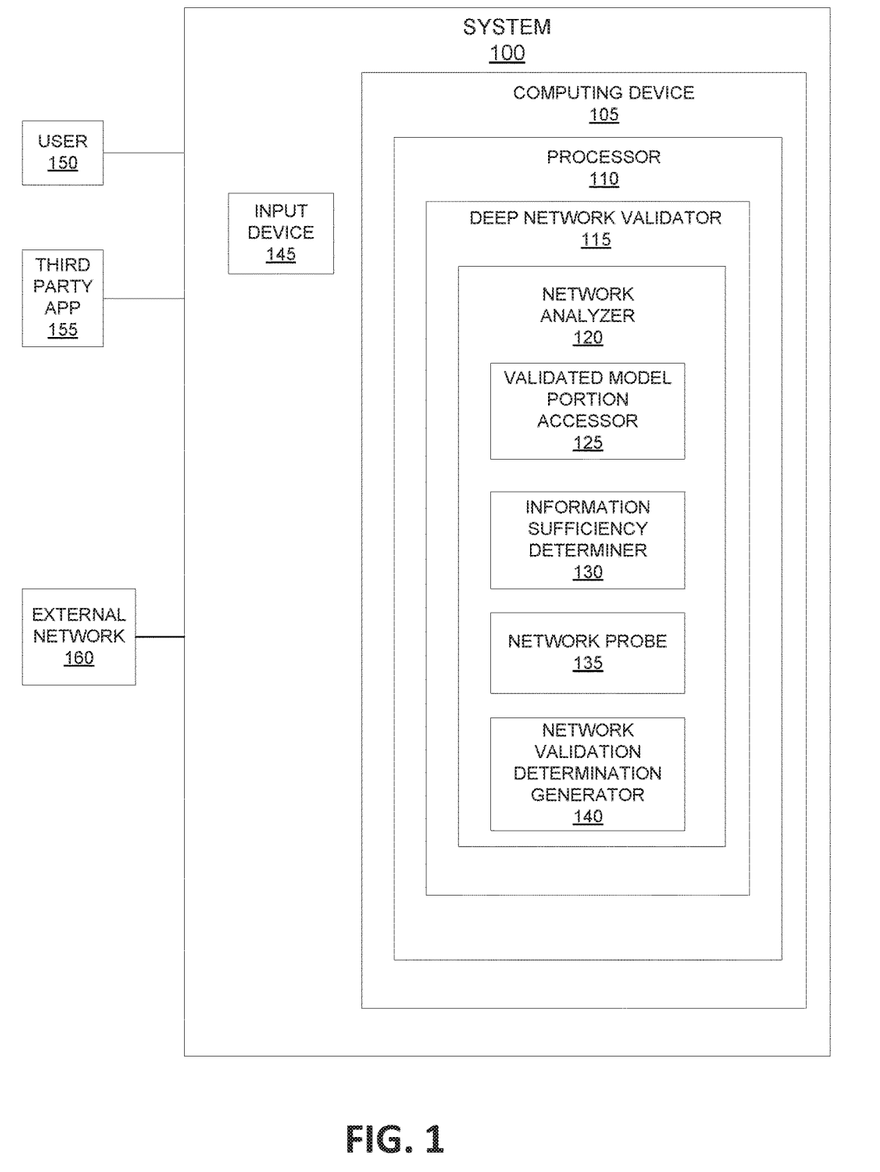
FIG. 1 depicts a block diagram of a system for deep network validation of configuration inputs for a network-dependent system, in accordance with an embodiment.

FIG. 1 depicts, in accordance with an embodiment, a system 100 that includes a computing device 105 and an input device 145. The system 100 is communicatively coupled with an external network 160 (a network external to the computing device 105), a user 150 and/or a third party application 155. It should be appreciated that the input device 145, in one embodiment, is communicatively coupled with but external to the computing device 105, but in another embodiment, the input device 145 resides at the computing device 105. The computing device 105 may be a consumer product or part thereof, in various embodiments. Additionally, in one embodiment, the computing device 105 includes the computer 400 of FIG. 4. As shown, a processor 110 is located at the computing device 105 and is shown to be a part thereof. It should be appreciated though, that in one embodiment, the processor 110 is the computing device 105. In one embodiment, the processor 110 includes the deep network validator 115. Additionally, in one embodiment, the processor 110 includes the components of the computer 400 shown in FIG. 4. While the deep network validator 115 is shown to be a part of the processor 110, it should be noted that in one embodiment, the deep network validator 115 may reside external to, but be communicatively coupled with, the computing device 105.

Figure 2:
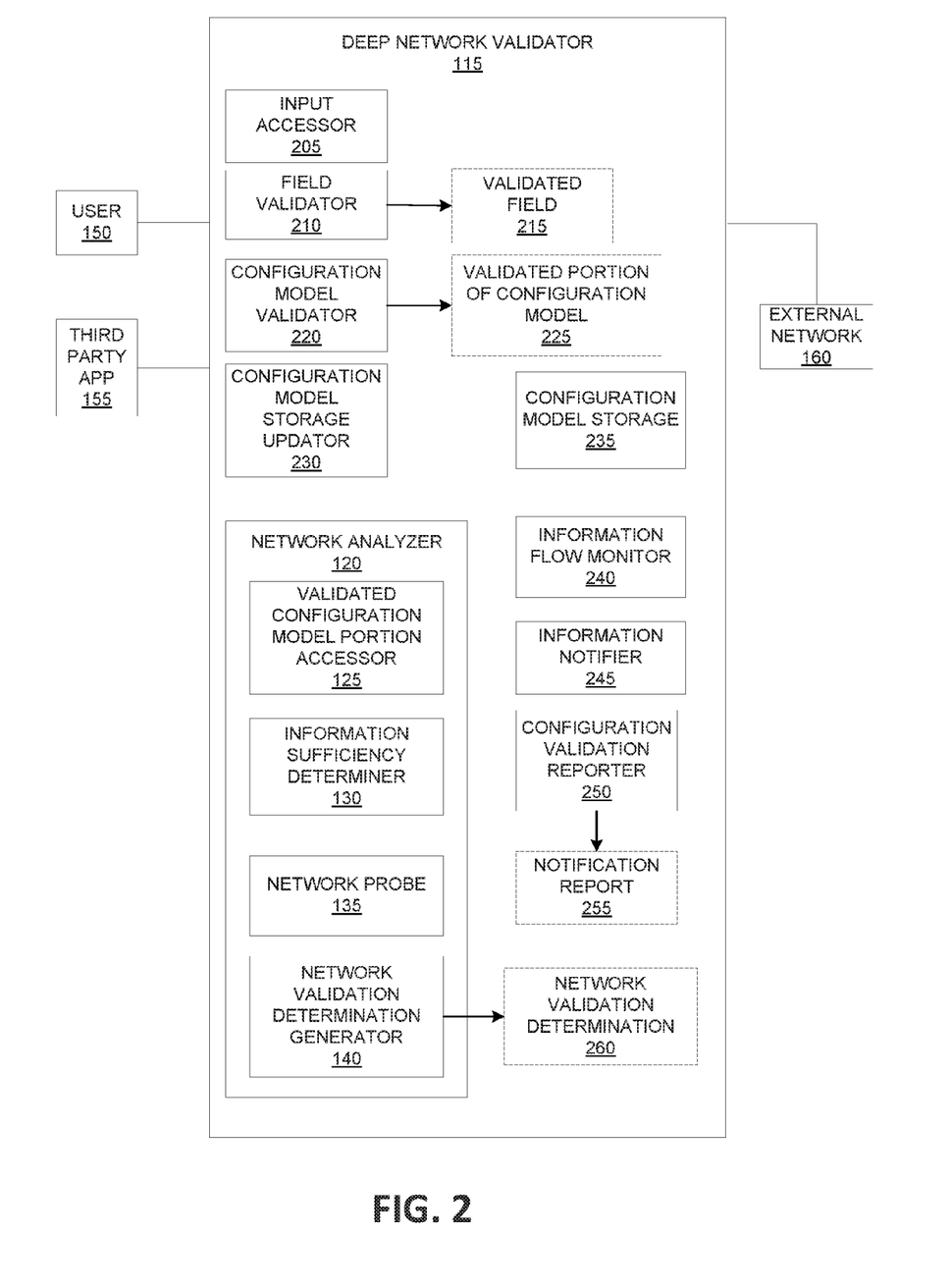
FIG. 2 depicts a block diagram of a deep network validator, in accordance with an embodiment.

In one embodiment and as will be explained below in further detail below, the computing device 105 is an appliance. In one embodiment, the deep network validator 115 includes a network analyzer 120. As will be explained below in more detail, the deep network validator 115 includes a network analyzer 120. The network analyzer 120 includes the following components communicatively coupled with each other: a validated model portion accessor 125; an information sufficiency determine 130; a network probe 135; and a network validation determination generator 140.

In various embodiments, the deep network validator 115 further optionally includes any of the following components that may each be communicatively coupled with each other: an input accessor 205; a field validator 210; a configuration model validator 220; a configuration model storage updator 230; a configuration model storage 235; an information flow monitor 240; an information notifier 245; and a configuration validation reporter 250.

The validated model portion accessor 125 is configured for accessing a validated portion of input that was validated at the configuration model level, wherein the portion of information that was validated was determined to be internally consistent with the configuration information found within the computing device 105. (The syntactical level and the configuration model level will be explained below in detail.)

The information sufficiency determiner 130 is configured for determining if the validated portion of input is sufficient to enable a network validation to be performed. The determination of sufficiency is dependent on what is needed to validate the input (e.g., the information that was input and accessed by the input accessor 205). For example, to validate a service at the environmental level depends on the service type. With a read-only service, such as a logger, the IP address is needed to do ping level validation. For a service that can be queried, the IP address and the type of queries accepted (usually known by the type of service) are required.

The network probe 135 is configured for querying the external network 160 to determine if the external network 160 has a configuration enabling a functioning of the computing device 105 therein. As the following examples will discuss, the network analyzer 120 (including the network probe 135) is capable of various functions, in accordance with various embodiments.

For example, in one embodiment, if the user 150 attempts to define or use a Virtual Local Area Network (VLAN) in the user's 150 configuration, the network probe 135 validates that the VLANS can actually facilitate movement of traffic (i.e., they exist on the switch). In one embodiment, the network analyzer 120 validates VLAN configuration by creating one or more temporary port groups on at least two hosts and checks to see if the temporary port groups can communicate. If the VLAN fails to route the traffic, it means that the switch does not have the VLAN configured properly and the VLAN definition is assumed to be invalid.

In another example embodiment, the network analyzer 120 validates that a multicast is set properly over IPv6, if it is in fact the case that the multicast is in fact set properly over IPv6. In one embodiment, it is ensured that all components that are intended to be configured for a multicast are actually properly configured (IGMP—Group Mgmt Protocol—Snooping and Querier, Querier required for snooping to work—settings included) such that the components can correctly communicate with each other. In one embodiment, the network probe 135 validates an IPv6 multicast configuration by creating temporary multicast groups on at least two hosts and checks to see if the multicast groups are able to communicate. If the multicast groups fail to route traffic, then it is determined that the multicast is not configured properly and the IPv6 definition is assumed to be invalid. Thus, in one embodiment, the network analyzer 120 is configured to accept a request to validate IPv6, in response to that request, create one or more temporary multicast groups on two or more hosts, and then determine if the hosts can communicate.

In another embodiment, the network analyzer 120 validates the existence and status of various network services (e.g., NTP, Syslog, DNS, etc.) that are configured by the user 150. In one embodiment, on request to configure a network service, the network probe 135 connects to the network on which the service is sitting to validate whether or not the service is actually listening on that IP and the service is responding to queries. In one embodiment, notifications (such as a notification report 255) are sent to the user 150 by the configuration validation reporter 250 if the service is responding properly (i.e., success), returning errors, not responding to queries but can be pinged, or is not responding to pings.

In another embodiment, the network analyzer 120 validates conflicts to confirm that no one is using an IP address that is to be assigned to an IP pool. Each IP in the IP pool is pinged or checked by the network probe 135 to make sure that nothing is responding on that IP. In one embodiment, a response means that the IP is being used by another and that, therefore, the configured IP is considered invalid. In one embodiment, the network analyzer 120 is configured to accept requests to determine that one or more IP addresses are not being used. In another embodiment, the network analyzer 120 is configured to accept requests to determine that a network service exists at a specific IP address by sending a valid service query to that IP address and processing the response.

When the result of the network validation is determined to be valid (i.e., successful), the configuration validation reporter 250 sends a success notification (in a notification report 255) to the user 150. If the result of the network validation is determined to be invalid (i.e., fails), the configuration model storage 235 is not updated and the configuration validation reporter 250 sends one or more error messages (in a notification report 255) to the user 150. Of note, when messages are sent to the user 150, as described herein, it is meant that these messages (or notification report(s) 255) are sent directly and/or indirectly (i.e., through a mediator [e.g., one or more components that routes the message) to the user 150. In one embodiment, the user 150 is sent a message (notification report 255) that describes which field, of a quantity of fields, is correct. Of note, in one embodiment, a message (notification report 255) is displayed at a display screen of the system 100.

The network validation determination generator 140 is configured for, based on the querying performed by the network probe 135, generating a network validation determination 260. In one embodiment, the network validation determination 260 is a determination that the external network 160 has a configuration that enables a functioning of the computing device 105 therein. However, in another embodiment, the network validation determination 260 is a determination that the external network 160 does not have a configuration that enables a functioning of the computing device 105 therein In one embodiment, the input accessor 205 accesses the input. In the context of features of embodiments, the term assesses refers to either receiving input or retrieving input from another source (i.e., user 150, third party application 155, etc.) The input, in one embodiment, is user 150 input from a user 150. In another embodiment, the input is from a third party application 155. In one embodiment, the input is network configuration information.

In one embodiment, the field validator 210 is configured for validating that a content of a field conforms to a format expected by the computing device 105, thereby achieving a validated field 215. The field validator 210 operates at the syntactical level. For example, the format of the field is checked to see if it is correct as to value types and absolute limits expected by the computing device 105. More particularly, in one embodiment, the field validator 210 may validate that an IPv4 IP address contains four numbers between 0 and 255, each separated by a period.

In one embodiment, the configuration model validator 220 is configured for evaluating the portions of the validated field 215 that are part of the configuration model of the computing device 105 to determine if the configuration model is consistent with the validated field 215. That is, if the configuration information of the computing device 105 is the same as the validated portion of the configuration model 225 of the validated field 215 (input), then at least the portion of the validated field 215 is determined to be consistent and validated. This is accomplished by having assigned a set of rules regarding how different fields are related to each other. For example, if two values are part of a range of IPv4 values, then a logical rule could be created that allows the second value only if the first three numbers in the second value are identical to the first three numbers in the first, and the fourth number in the second value is greater than the fourth number in the first. If the value of the validated portion of configuration model 225 of the validated field 215 that was evaluated does not make the configuration internally inconsistent, this value is stored at the configuration model storage 235 by the configuration model storage updater 230.

The information flow monitor 240 is configured for monitoring the flow of input to the input accessor 205. The information flow monitor 240 determines when the flow of input to the input accessor 205 ceases and resumes. Once the information flow monitor 240 is configured for determining that the flow of the input to the input accessor 205 has ceased, then the information flow monitor 240 notifies the information notifier 245 of such cessation. The information notifier 245 is configured for communicating, to the network analyzer 120, the occurrence of this cessation of input flow.

3. Methods of Operation

Figure 3:
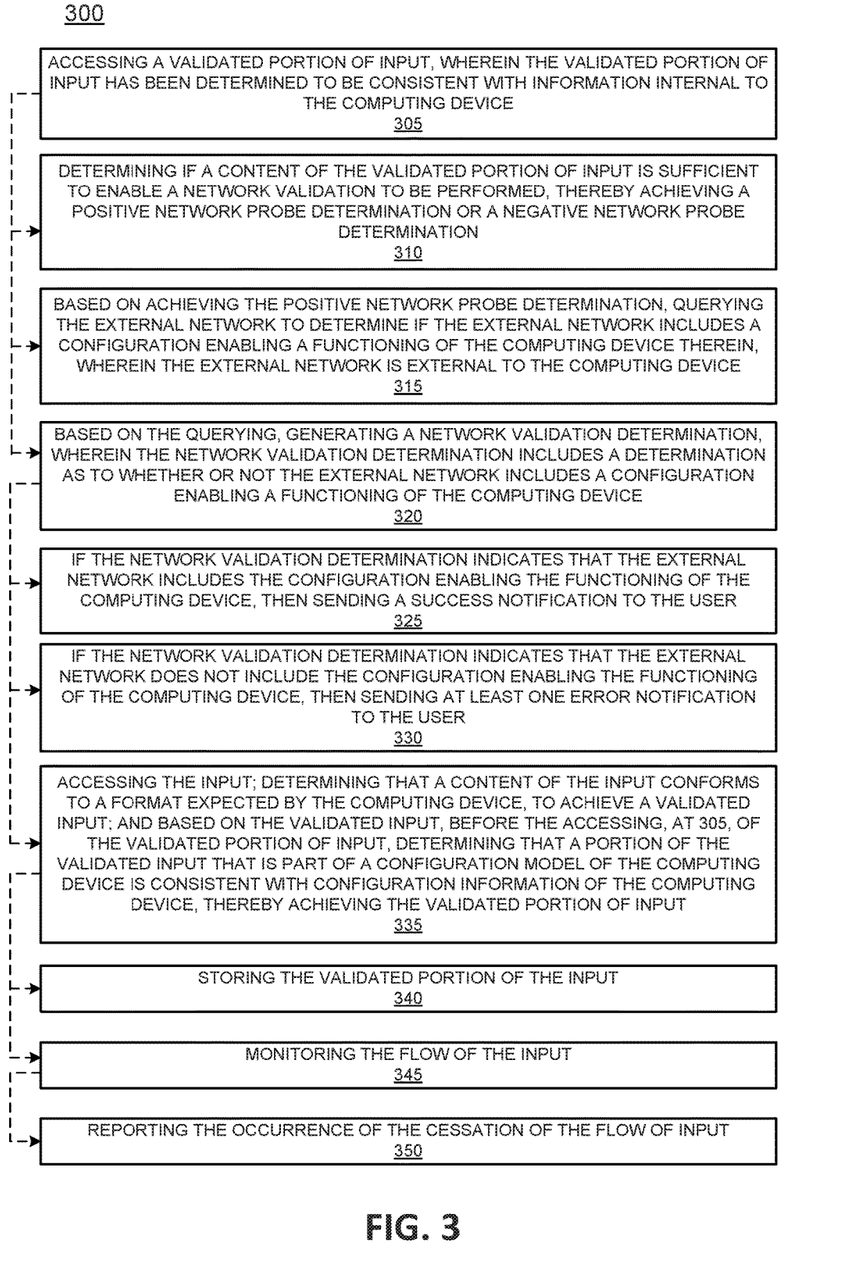
FIG. 3 depicts a flow diagram for a method for deep network validation of configuration inputs for a network-dependent system, in accordance with an embodiment.

The following discussion sets forth in detail the operation of some example methods of operation of embodiments. With reference to FIG. 3, flow diagram 300 illustrates example procedures used by various embodiments. Flow diagram 300 includes some procedures that, in various embodiments, may include some steps that are carried out by a processor 110 under the control of computer-readable and computer-executable instructions. In this fashion, procedures described herein and in conjunction with flow diagram 300 are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, solid state drives/"disks," and optical disks, any or all of which may be employed with computer environments. The computer-readable and computer-executable instructions, which reside on tangible computer readable storage media, are used to control or operate in conjunction with, for example, one or some combination of processors of the computer environments and/or virtualized environment. It is appreciated that the processor(s) may be physical or virtual or some combination (it should also be appreciated that a virtual processor is implemented on physical hardware). Although specific procedures are disclosed in flow diagram 300, such procedures are examples. That is, embodiments are well suited to performing various other procedures or variations of the procedures recited in flow diagram 300. Likewise, in some embodiments, the procedures in flow diagram 300 may be performed in an order different than presented and/or not all of the procedures described in one or more of these flow diagrams may be performed.

The following discussion of method 300 references FIGS. 1-3 unless specifically noted otherwise.

FIG. 3 depicts a process flow diagram 300 of a method for validating configuration inputs for a computing device dependent on a network, according to various embodiments.

At 305, a validated portion of input is accessed, wherein the validated portion of input has been determined to be consistent with information internal to the computing device, according to an embodiment and as described herein.

At 310, it is determined if a content of the validated portion of input is sufficient to enable a network validation to be performed, thereby achieving a positive network probe determination or a negative network probe determination, according to an embodiment and as described herein. The validated portion of the input, which is at an accessible storage module (e.g., memory), is analyzed to determine if the content thereof includes one or more blocks of data with sufficient information to facilitate a successful probing of the network and a successful network validation. For example, and as described herein, for a network service to be queried, it is necessary for the content of the validated portion of input (that is also stored at an accessible location) to include the IP address and type of query (usually known by the type of network service).

At 315, based on the positive network probe determination, the external network is queried to determine if the external network includes a configuration enabling a functioning of the computing device therein, wherein the external network is external to the computing device, according to an embodiment and as described herein. In one example of an application of an embodiment, if the user attempts to use an external network such as a VLAN, then it is determined, via querying the VLAN, if the VLAN can actually facilitate movement of traffic.

At 320, based on the querying, a network validation determination is generated, wherein the network validation determination includes a determination as to whether or not the external network includes a configuration enabling a functioning of the computing device therein, according to an embodiment and as described herein. For example, the network validation determination could either indicate that the external network includes or does not include a configuration that enables the computing device to function as intended. For example, a user intends to use a VLAN via his/her computing device (that is being setup) by including the VLAN in the input (as network configuration information). However, embodiments determine that the VLAN is unable to route traffic. Embodiments generate a network validation determination that the VLAN is unable to route traffic (as a switch does not have a VLAN configured properly). Therefore, as it is specified in the input (network configuration information) that the computing device is to use the VLAN and the probing of the VLAN shows that the VLAN is unable to actually route traffic, then it is determined that the computing device is unable to function as intended.

For example and at 325, if the network validation determination indicates that the external network includes the configuration enabling the functioning of the computing device, then a success notification is sent to the user, according to an embodiment and as described herein. In another example and at 330, if the network validation determination indicates that the external network does not include the configuration enabling the functioning of the computing device, then at least one error notification is sent to the user, according to an embodiment and as described herein.

At 335, the input is accessed; it is determined if a content of the input conforms to a format expected by the computing device, to achieve a validated input; and based on the validated input, before the accessing (at 305) of the validated portion of input, it is determined that a portion of the validated input that is part of a configuration model of the computing device is consistent with configuration information of the computing device, thereby achieving the validated portion of input, according to an embodiment and as described herein. As described herein, the accessing of the input refers to, in one embodiment, features of the invention retrieving the input. Yet, in another embodiment, accessing the input refers to features of the invention receiving the input. As also described herein, the determining that a content of the input conforms to a format expected by the computing device occurs at the syntactical level. The determining that the portion of the validated input that is part of the configuration model of the computing device is consistent with the configuration information of the computing device occurs at the model configuration level.

In one embodiment, the input is user input. For example, in one embodiment, during setup, the user enters information associated with the computing device, wherein such information specifies network configuration information. In another embodiment, the input is third party application input.

At 340, the validated portion of the input referred to in step 335 is stored, according to an embodiment and as described herein. In one embodiment, the validated portion of the input is stored at the computing device. In another embodiment, the validated portion of the input is stored external to the computing device.

At step 345, the flow of the input in step 335 is monitored, according to an embodiment and as described herein. For example, the flow of input refers to the accessing of the input, either through retrieving or receiving, and either from a user or a third party application. Once the accessing of input stops, so too does the flow of input. Embodiments determine if this flow of input is continuing or has ceased. In one embodiment, this determination of the continuance or the cessation of the flow of input is based timing. For example, in one embodiment, if it is determined that a predetermined period of time has elapsed and a flow of input has not been detected, then it is determined that the flow of input has ceased.

At step 350, the occurrence of the cessation of the flow of the input described in step 345 is reported, according to an embodiment and as described herein. In one embodiment, the cessation of the flow of the input is reported to a component of the deep network validator, such as, for example, the network analysis module.

In one embodiment, a request to validate that one or more IP addresses are not being used is accepted. In another embodiment, a request to validate that a network service exists at a specific IP address is accepted, and in response to that request, that specific IP address is pinged. In another embodiment, a request to validate that a network service exists at a specific IP address is accepted, a valid service query is sent to that IP address in response to the request, and then a response to the valid service query is processed.

In another embodiment, a request is accepted to validate IPv6. In response to that request, one or more temporary multicast groups are created on two or more hosts. It is then determined if the hosts can communicate.

In one embodiment, if the user attempts to define or use a VLAN in the user's configuration, it is validated that the VLANS can actually facilitate movement of traffic (i.e., they exist on the switch). In one embodiment, the VLAN configuration is validated by creating one or more temporary port groups on at least two hosts and checked to see if the temporary port groups are able to communicate. If the VLAN fails to route the traffic, it means that the switch does not have the VLAN configured properly and the VLAN definition is assumed to be invalid.

It is noted that any of the procedures, stated above, regarding flow diagram 300 may be implemented in hardware, or a combination of hardware with firmware and/or software. For example, any of the procedures are implemented by a processor(s) of a cloud environment and/or a computing environment.

4. Example Computing Environment

Figure 4:
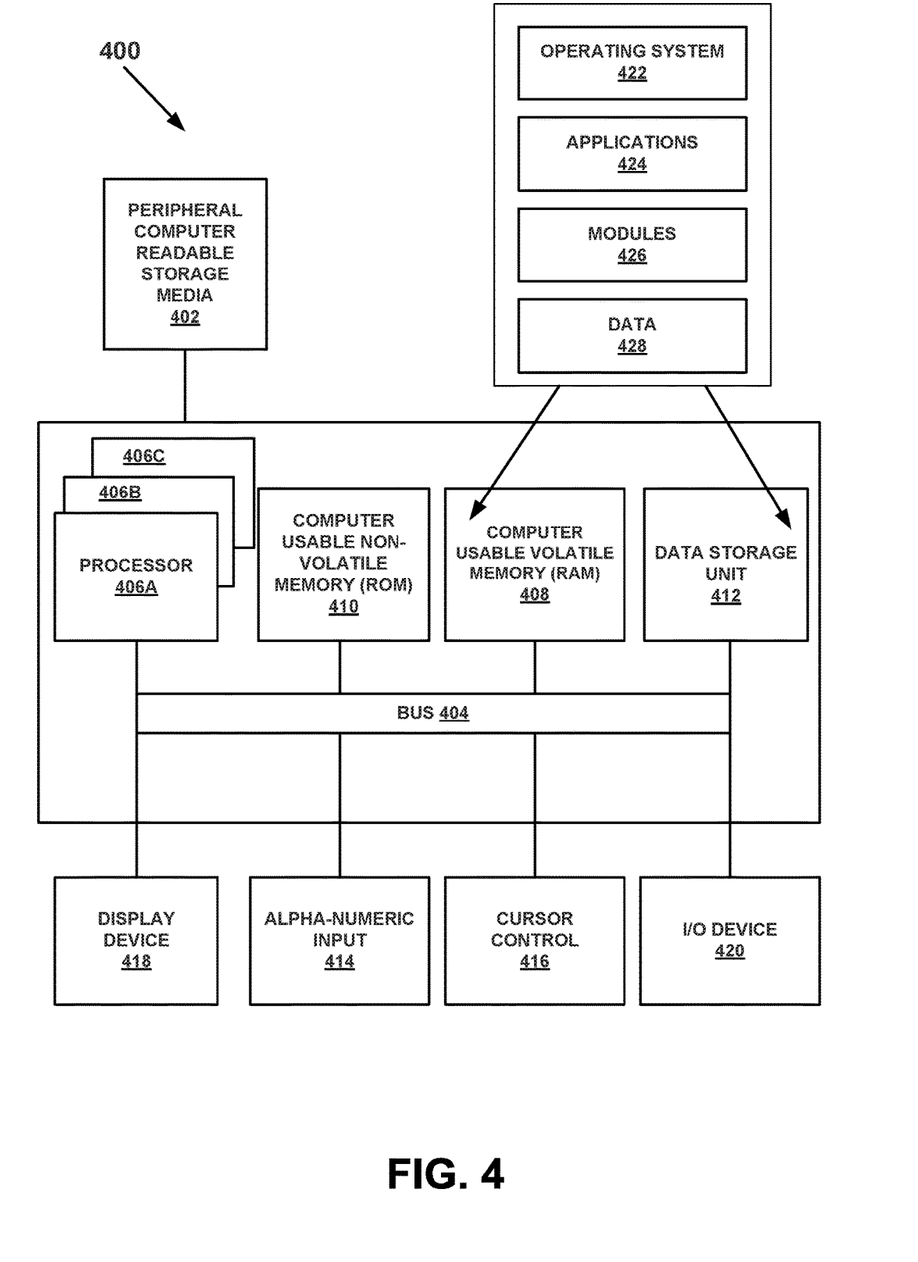
FIG. 4 depicts a block diagram of an example computing system, in accordance with an embodiment.

With reference now to FIG. 4, all or portions of some embodiments described herein are composed of computer-readable and computer-executable instructions that reside, for example, in computer-usable/computer-readable storage media of a computer system. That is, FIG. 4 illustrates one example of a type of computer (computer system 400) that can be used in accordance with or to implement various embodiments which are discussed herein. It is appreciated that computer system 400 of FIG. 4 is only an example and that embodiments as described herein can operate on or within a number of different computer systems including, but not limited to, general purpose networked computer systems, embedded computer systems, routers, switches, server devices, client devices, various intermediate devices/nodes, stand alone computer systems, distributed computer systems, media centers, handheld computer systems, multimedia devices, and the like. Computer system 400 of FIG. 4 is well adapted to having peripheral non-transitory computer-readable storage media 402 such as, for example, a floppy disk, a compact disc, digital versatile disc, other disc based storage, universal serial bus "thumb" drive, removable memory card, and the like coupled thereto.

System 400 of FIG. 4 includes an address/data bus 404 for communicating information, and a processor 406A coupled with bus 404 for processing information and instructions. As depicted in FIG. 4, system 400 is also well suited to a multi-processor environment in which a plurality of processors 406A, 406B, and 406C are present. Conversely, system 400 is also well suited to having a single processor such as, for example, processor 406A. Processors 406A, 406B, and 406C may be any of various types of microprocessors, and may be the processor 102 described with respect to FIGS. 1 and 2. System 400 also includes data storage features such as a computer usable volatile memory 408, e.g., random access memory (RAM), coupled with bus 404 for storing information and instructions for processors 406A, 406B, and 406C.

System 400 also includes computer usable non-volatile memory 410, e.g., read only memory (ROM), coupled with bus 404 for storing static information and instructions for processors 406A, 406B, and 406C. In one embodiment, the memory device 124 of FIGS. 1 and 2 is an example the computer usable volatile memory 408 and/or the computer usable non-volatile memory 410. Also present in system 400 is a data storage unit 412 (e.g., a magnetic or optical disk and disk drive) coupled with bus 404 for storing information and instructions. System 400 also includes an optional alphanumeric input device 414 including alphanumeric and function keys coupled with bus 404 for communicating information and command selections to processor 406A or processors 406A, 406B, and 406C. System 400 also includes an optional cursor control device 416 coupled with bus 404 for communicating user input information and command selections to processor 406A or processors 406A, 406B, and 406C. In one embodiment, system 400 also includes an optional display device 418 coupled with bus 404 for displaying information.

Referring still to FIG. 4, optional display device 418 of FIG. 4 may be a liquid crystal device, cathode ray tube, plasma display device or other display device suitable for creating graphic images and alphanumeric characters recognizable to a user. Optional cursor control device 416 allows the computer user to dynamically signal the movement of a visible symbol (cursor) on a display screen of display device 418 and indicate user selections of selectable items displayed on display device 418. Many implementations of cursor control device 416 are known in the art including a trackball, mouse, touch pad, joystick or special keys on alphanumeric input device 414 capable of signaling movement of a given direction or manner of displacement. Alternatively, it will be appreciated that a cursor can be directed and/or activated via input from alphanumeric input device 414 using special keys and key sequence commands. System 400 is also well suited to having a cursor directed by other means such as, for example, voice commands. System 400 also includes an I/O device 420 for coupling system 400 with external entities. For example, in one embodiment, I/O device 420 is a modem for enabling wired or wireless communications between system 400 and an external network such as, but not limited to, the Internet.

Referring still to FIG. 4, various other components are depicted for system 400. Specifically, when present, an operating system 422, applications 424, modules 426, and data 428 are shown as typically residing in one or some combination of computer usable volatile memory 408 (e.g., RAM), computer usable non-volatile memory 410 (e.g., ROM), and data storage unit 412. In some or all embodiments described herein, the applications 424 include the deep network validator 115. In some or all of the embodiments described herein, the modules 426 include any of the following: deep network validator 115; input accessor 205; field validator 210; configuration model validator 220; configuration model storage updator 230; configuration model storage 235; network analysis module 120; information flow monitor 240; information notifier 245; and configuration validation reporter 250. In some embodiments, all or portions of various embodiments described herein are stored, for example, as an application 424 and/or module 426 in memory locations within RAM 408, computer-readable storage media within data storage unit 412, peripheral computer-readable storage media 402, and/or other tangible computer-readable storage media.

5. Appliance

Figure 5:
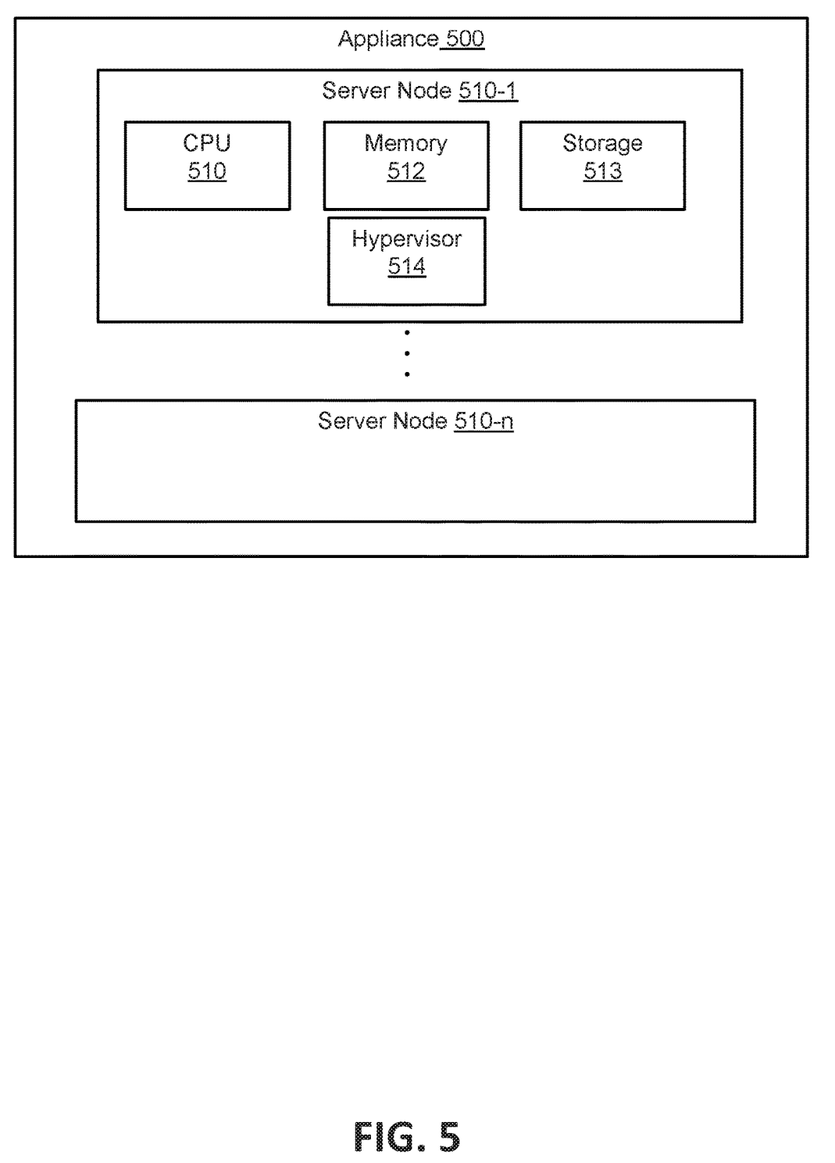
FIG. 5 depicts a block diagram of an appliance, in accordance with an embodiment.

Of note, in one embodiment, the computing device is an "appliance". FIG. 5 is block diagram of an example appliance, in accordance with an embodiment. An appliance includes the requisite physical hardware and software to create and manage a virtualization infrastructure. The appliance is also a pre-configured hyper-converged computing device. In general, a hyper-converged computing device includes pretested, pre-configured and pre-integrated storage, server and network components, including software, that are located in an enclosure. Moreover, the hyper-converged computing device includes a hypervisor that supports a virtualization infrastructure.

Based on the pre-configured hardware and software disposed within the appliance, the appliance enables a user to simply and quickly create a virtualization infrastructure and deploy virtual machines shortly after the appliance is powered on for the first time.

The appliance includes, among other things, at least one server node. For example, server nodes 510-1 through server node 510-n. Server node 510-1 includes a central processing unit (CPU) 511, memory 512, and storage 513. It should be appreciated that other server nodes (i.e., server node 510-n) each include a CPU, memory, and storage similar to server node 510-n.

Additionally, each server node includes a hypervisor. For example, server node 510-1 includes hypervisor 514 and server node 510-n also includes a hypervisor. A hypervisor is installed on top of hardware platform (e.g., CPU, memory and storage) and supports a virtual machine execution space within which one or more virtual machines (VMs) may be concurrently instantiated and executed.

In various embodiments, a hypervisor is VMware ESX™ hypervisor or a VMware ESXi™ hypervisor. It is noted that "ESX" is derived from the term "Elastic Sky X" coined by VMware™. Additionally, as stated above, if hypervisor is a VMware ESX™ hypervisor, then virtual functionality of the host is considered a VMware ESX™ server. Moreover, although the node is physical hardware it includes hypervisor functionality based on the hypervisor implemented on the server node.

The appliance is scalable. That is, the appliance can be scaled to include more than one server node. For example, the appliance can initially have a single server node. However, additional server nodes may be included in the appliance.

In one embodiment, the appliance is able to deploy a plurality of virtual machines in the virtualization infrastructure. For example, based on the hardware and software incorporated in the appliance, the appliance is able to deploy pre-set number of virtual machines (e.g., 75 virtual machines, 150 virtual machines, etc.).

Moreover, each server node may be considered a server or host computing system. That is, each server node is able to independently host a number of virtual machines. For example, server node 510-1 is able to host a first set of virtual machines, while other server nodes are each able to independently host other sets of virtual machines, respectively.

The server nodes are independent of one another, and are not required to share any functionality with one another. The appliance does not include a backplane. As such, the server nodes are isolated from one another and therefore independent of one another.

The CPU may be, but is not limited to, a dual socket CPU (e.g., Intel Xeon™ CPUs, 4-core to 6-core).

The memory may be, but is not limited to, 128 gigabytes (GB).

The storage may be, but is not limited to, three drive slots per node. Such as a solid state drive (SSD) (e.g., an SSD up to 800 GB), and two hard disk drives (HDD) (e.g., HDDs up to 8 terabytes (TB)).

Additionally, the appliance may include various external interfaces, such as but not limited to, serial, network RJ-45 (10000 NIC), graphics, management RJ-45 (100/10000 NIC), power (in front and in rear), UID (in front and in rear) and a USB.

The appliance may also include Component Interconnect Express (PCIe) expansion slots, and a disk controller with pass through capabilities. It should be appreciated that the appliance may include other hardware attributes that are compatible with supporting a virtualization infrastructure.

In one embodiment, the appliance is a rackable 2U/4Node appliance. That is, the appliance is two rack units in height and includes four server nodes (e.g., server nodes 510-1 through 510-*n*).

The size of a piece of rack-mounted equipment is described as a number in "U" or "RU" (rack unit). One rack unit is often referred to as "1U", 2 rack units as "2U" and so on. "U" is a unit of measure that describes the height of equipment designed to mount in a rack (e.g., 19-inch rack or a 23-inch rack). The 19-inch (482.6 mm) or 23-inch (584.2 mm) dimension refers to the width of the equipment mounting frame in the rack including the frame. In some instances, one rack unit is 1.75 inches (4.445 cm) high.

In another embodiment, the appliance is a 4U/4Node appliance. That is, the appliance is four rack units in height and includes 4 server nodes (e.g., server nodes 510-1 through 510-*n*).

The appliance includes software to support a virtualization infrastructure. That is, the appliance includes code or instructions stored on physical hardware in the appliance, that when executed by a processor, supports a virtualization infrastructure. For instance, the appliance includes pre-configured software module.

It should be appreciated that the software installed on appliance 500 is stored in a storage device. In various embodiments, the software may be installed in a single server node or may be distributed in various server nodes. In another embodiment, the software may be stored in a storage device within the appliance but is outside of the server nodes.

During operation of the appliance, the software may be executed by one or more CPUs in a single server node or the execution may be distributed amongst various CPUs in various server nodes.

It should be appreciated that the software module, in one embodiment, includes a suite of software tools for cloud computing (e.g., VMware vSphere™, VCenter™) that utilizes various components such as a VMware ESX/ESXi hypervisor. Accordingly, the software module may be a controlling module for at least appliance 500 based on the controlling software tools (e.g., VMware vSphere™, VCenter™).

The software module, in one embodiment, includes a centralized management tool for an appliance or a cluster of appliances. The centralized management tool, in one embodiment, is for the management of multiple ESX hosts and virtual machines (VMs) from different ESX hosts through a single console application. It should be appreciated that the virtualization infrastructure, or portions of the virtualization infrastructure may be managed by the centralized management tool via a user interface. Additionally, the centralized management tool manages or controls the hypervisors in appliance 500. For example, the centralized management tool controls the hypervisor it runs in and controls the other hypervisors in the other nodes.

6. Example Host Computer System

Figure 6:
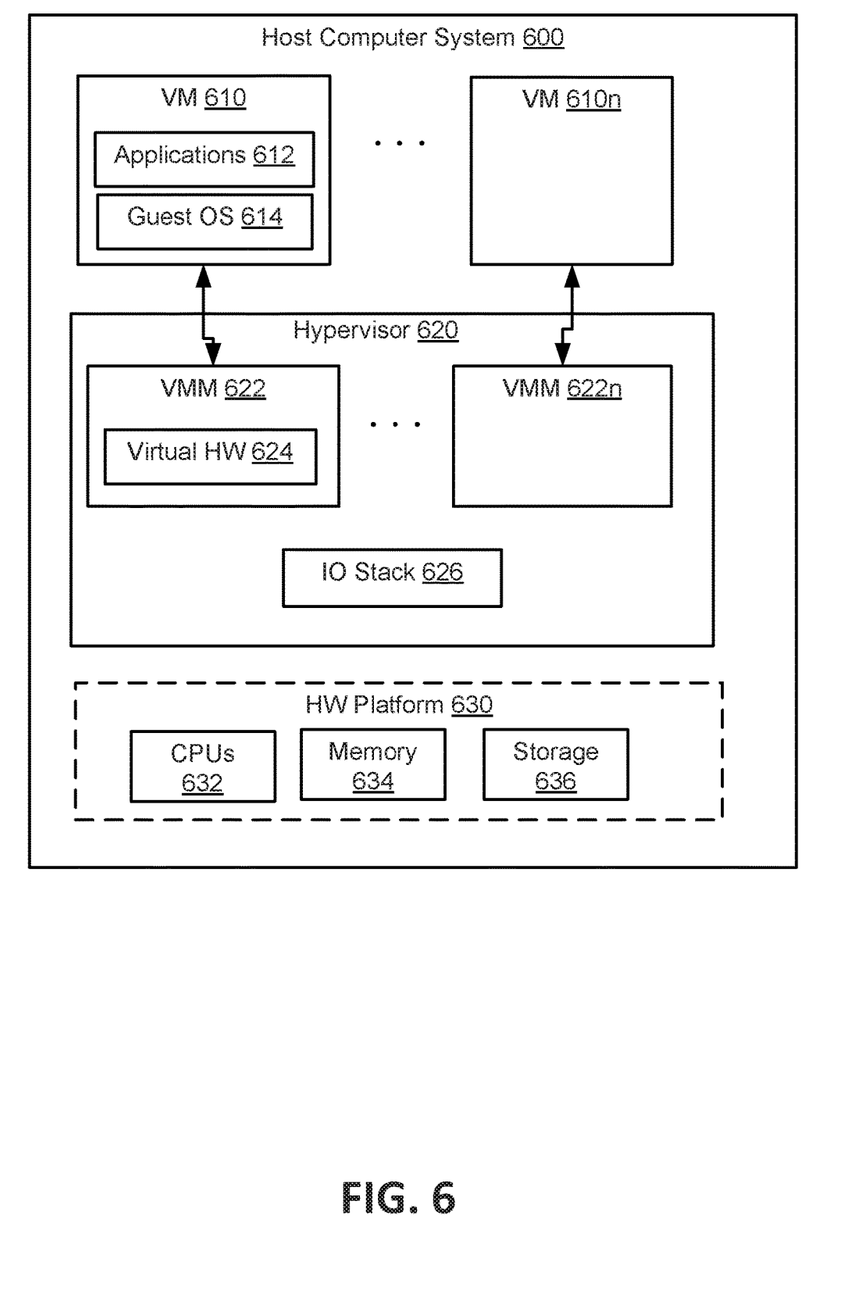
FIG. 6 depicts a block diagram of a host computer system, in accordance with an embodiment.

FIG. 6 is a schematic diagram that illustrates a host computer system 600 that is configured to carry out one or more embodiments of the present invention. Host computer system 600, in one embodiment, is the appliance 500. Host computer system 600 includes, among other things, virtual machines 610 through 610*n*, hypervisor 620, and hardware platform 630.

Hardware platform 630 includes one or more central processing units (CPUs) 632, system memory 634, and storage 636. Hardware platform 630 may also include one or more network interface controllers (NICs) that connect host computer system 600 to a network, and one or more host bus adapters (HBAs) that connect host computer system 600 to a persistent storage unit.

Hypervisor 620 is installed on top of hardware platform 630 and supports a virtual machine execution space within which one or more virtual machines (VMs) may be concurrently instantiated and executed. Each virtual machine implements a virtual hardware platform that supports the installation of a guest operating system (OS) which is capable of executing applications. For example, virtual hardware 624 for virtual machine 610 supports the installation of guest OS 614 which is capable of executing applications 612 within virtual machine 610.

Guest OS 614 may be any of the well-known commodity operating systems, and includes a native file system layer, for example, either an NTFS or an ext3FS type file system layer. IOs issued by guest OS 614 through the native file system layer appear to guest OS 614 as being routed to one or more virtual disks provisioned for virtual machine 610 for final execution, but such IOs are, in reality, reprocessed by IO stack 626 of hypervisor 620 and the reprocessed IOs are issued, for example, through an HBA to a storage system.

Virtual machine monitor (VMM) 622 and 622*n* may be considered separate virtualization components between the virtual machines and hypervisor 620 (which, in such a conception, may itself be considered a virtualization "kernel" component) since there exists a separate VMM for each instantiated VM. Alternatively, each VMM may be considered to be a component of its corresponding virtual machine since such VMM includes the hardware emulation components for the virtual machine. It should also be recognized that the techniques described herein are also applicable to hosted virtualized computer systems. Furthermore, although benefits that are achieved may be different, the techniques described herein may be applied to certain non-virtualized computer systems.

What we claim is:

1. A non-transitory computer-readable storage medium having instructions embodied therein that when executed cause a computer system to perform a method of validating configuration inputs for a computing device dependent on a network, said method comprising:

accessing a syntactically validated portion of input, wherein said syntactically validated portion of input is consistent with information internal to said computing device;

determining if a content of said syntactically validated portion of input is sufficient to enable a network validation determination to be performed, thereby achieving a positive network probe determination or a negative network probe determination;

based on said positive network probe determination, querying an external network to determine if said external network comprises a configuration enabling a functioning of said computing device therein, wherein said external network is external to said computing device;

based on a response to said querying, generating said network validation determination, wherein said network validation determination comprises a determination as to whether or not said external network comprises said configuration enabling a functioning of said computing device therein;

before said accessing said syntactically validated portion of input, accessing input to be used during setup of said computing device;

determining that a content of said input conforms to a format expected by said computing device, to achieve syntactically validated input; and determining that a portion of said syntactically validated input that is part of a configuration model of said computing device is consistent with configuration information of said computing device, thereby achieving said syntactically validated portion of input.

2. The non-transitory computer-readable storage medium of claim 1, further comprising:
if said network validation determination indicates that said external network comprises said configuration enabling said functioning of said computing device, then sending a success notification to a user.

3. The non-transitory computer-readable storage medium of claim 1, further comprising:
if said network validation determination indicates that said external network does not comprise said configuration enabling said functioning of said computing device, then sending at least one error notification to a user.

4. The non-transitory computer-readable storage medium of claim 1, wherein said accessing said input to be used during setup of said computing device comprises:
accessing a user input.

5. The non-transitory computer-readable storage medium of claim 1, wherein said accessing said input to be used during setup of said computing device comprises:
accessing third party application input.

6. The non-transitory computer-readable storage medium of claim 1, further comprising:
storing said syntactically validated portion of said input.

7. The non-transitory computer-readable storage medium of claim 1, further comprising:
monitoring said flow of said input to be used during setup of said computing device.

8. The non-transitory computer-readable storage medium of claim 7, further comprising:
reporting an occurrence of a cessation of said flow of said input to be used during setup of said computing device.

9. A system for validating configuration inputs for a computing device dependent on a network, said system comprising:
a processor configured for:
accessing a syntactically validated portion of input, wherein said syntactically validated portion of input is consistent with information internal to said computing device;
determining if a content of said syntactically validated portion of input is sufficient to enable a network validation determination to be performed, thereby achieving a positive network probe determination or a negative network probe determination;
based on said positive network probe determination, querying an external network to determine if said external network comprises a configuration enabling a functioning of said computing device therein, wherein said external network is external to said computing device;
based on a response to said querying, generating said network validation determination, wherein said network validation determination comprises a determination as to whether or not said external network comprises said configuration enabling a functioning of said computing device therein; and an input device configured for:
receiving user input to be used during setup of said computing device,
wherein said processor is further configured for:
before said accessing said syntactically validated portion of input, accessing said user input to be used during setup of said computing device;
determining that a content of said user input to be used during setup of said computing device conforms to a format expected by said computing device, to achieve a syntactically validated input; and
based on said syntactically validated input, determining that a portion of said syntactically validated input that is part of a configuration model of said computing device is consistent with configuration information of said computing device, thereby achieving said syntactically validated portion of input.

10. The system of claim 9, further comprising:
a memory store,
wherein said processor is further configured for:
storing said syntactically validated portion of input at said memory store.

11. The system of claim 9, wherein said processor is further configured for:
reporting an occurrence of a cessation of a flow of said user input to be used during setup of said computing device.

12. The system of claim 9, wherein said processor is further configured for:
if said network validation determination indicates that said external network comprises said configuration enabling said functioning of said computing device, then sending a success notification to a user.

13. The system of claim 9, wherein said processor is further configured for:
if said network validation determination indicates that said external network does not comprise said configuration enabling said functioning of said computing device, then sending at least one error notification to a user.

14. The system of claim 9, wherein said processor is further configured for:
before said accessing said syntactically validated portion of input, accessing user input to be used during setup of said computing device;
determining that a content of said user input to be used during setup of said computing device conforms to a format expected by said computing device, to achieve a syntactically validated input; and
based on said syntactically validated input, determining that a portion of said syntactically validated input that is part of a configuration model of said computing device is consistent with configuration information of said computing device, thereby achieving said syntactically validated portion of input.

15. The system of claim 14, wherein said processor is further configured for:
reporting an occurrence of a cessation of a flow of said user input to be used during setup of said computing device.

16. The system of claim 9, further comprising:
a memory store,
wherein said processor is further configured for:
storing said syntactically validated portion of input at said memory store.

17. The system of claim 9, further comprising:
a display configured for displaying a result of said determining a network validation.

\* \* \* \* \*